May 20, 1958     M. E. McCLELLAN     2,835,100

RECIPROCATING AUGER FEEDER FOR BALERS

Filed May 24, 1955     2 Sheets-Sheet 1

*INVENTOR.*
M. E. McCLELLAN

*INVENTOR.*
M. E. McCLELLAN

United States Patent Office 2,835,100
Patented May 20, 1958

2,835,100

RECIPROCATING AUGER FEEDER FOR BALERS

Marcus E. McClellan, Ottumwa, Iowa, assignor to Deere Manufacturing Co., Dubuque, Iowa, a corporation of Iowa Application May 24, 1955, Serial No. 510,730

14 Claims. (Cl. 56—341)

This invention relates to a crop-handling machine and more particularly to such machine as embodied in an agricultural baler of the mobile pick-up type.

A typical baler of the general character referred to will normally include a mobile main frame on which is mounted a bale case for receiving harvested crops from a pick-up means. In balers of the so-called in-line type, the bale case is elongated in the direction of advance and, as the baler advances over the field, the pick-up means picks up previously harvested and windrowed crops, transfers these crops rearwardly, and a feeder, such as an auger, moves the crops transversely into the longitudinal bale case, where bales are formed in any suitable manner, such as by a reciprocating plunger. A representative baler disclosure of the nature referred to above is found in the U. S. patent to Crumb 2,450,082.

In the use of an auger for a preliminary feeder, there is always the problem of moving crops from the end of the auger into the bale case in the path of the plunger. Therefore, prior art machines use secondary feeders operating at the discharge end of the auger and in timed relationship with the plunger for moving the crops into the bale case as the plunger recedes or retracts on one phase of its reciprocation. According to the present invention, the secondary feeder is eliminated by the use of a reciprocating auger which, in addition to its function in rotational feeding, moves lengthwise of its axis so as to alternately project and withdraw its discharge end through the feed opening in the side of the bale case. The invention features a novel and simple arrangement of operating parts for supporting and driving the auger.

The foregoing and other important objects and desirable features inherent in and encompassed by the invention will become apparent as preferred embodiments of the invention are disclosed in detail in the following specification and accompanying sheets of drawings, the several figures of which will be described immediately below.

The baler chosen for the purposes of illustration has an overall appearance very much like that of conventional balers as typified in the above noted patent to Crumb, and comprises a mobile main frame 10 carried on right and left hand wheels 12 and 14 and including a forwardly extending draft tongue 16 by means of which the machine may be connected to an agricultural tractor, all of which is conventional.

Figure 3:
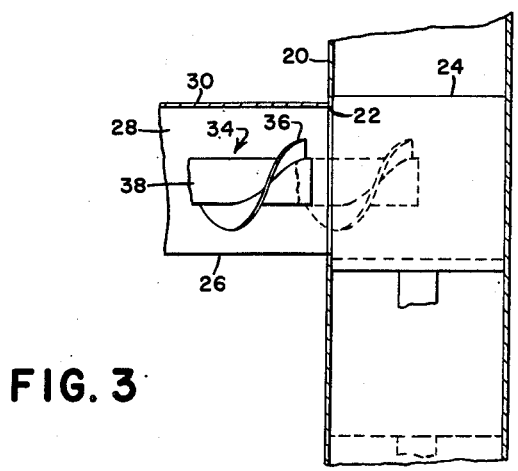
Fig. 3 is a fragmentary sectional view as seen substantially along the line 3—3 of Fig. 2.

The main frame further includes an elongated bale case 18 having an inner upright side wall 20 in which is provided a rectangular feed opening 22. Bales are successively formed in the bale case 18 by means of introducing crops through the feed opening 22 into the path of bale-forming means, here a reciprocating plunger 24 arranged for cyclic operation. This plunger reciprocates on alternate compression and retracting strokes and as it does so it alternately covers and uncovers the feed opening 22. Fig. 3 shows, in full lines, the plunger at the end of its compression stroke and illustrates that the feed opening 22 is covered. The same figure shows in dotted lines the position of the plunger at the end of its retracting stroke, in which case the feed opening 22 will be uncovered. Familiarity with the operation of balers in general is assumed and further details are omitted.

The baler frame 10 carries, alongside the bale case 18, pick-up means 26 for picking up previously harvested and windrowed crops and delivering them rearwardly onto floor means 28. This floor means extends laterally outwardly from the bale case and leads laterally inwardly to the feed opening 22. The floor means is delineated at its rear by a transverse upright rear wall 30 and at its outer end by an upright side wall which serves as an outer support 32 for structure to be presently described.

Figure 1:
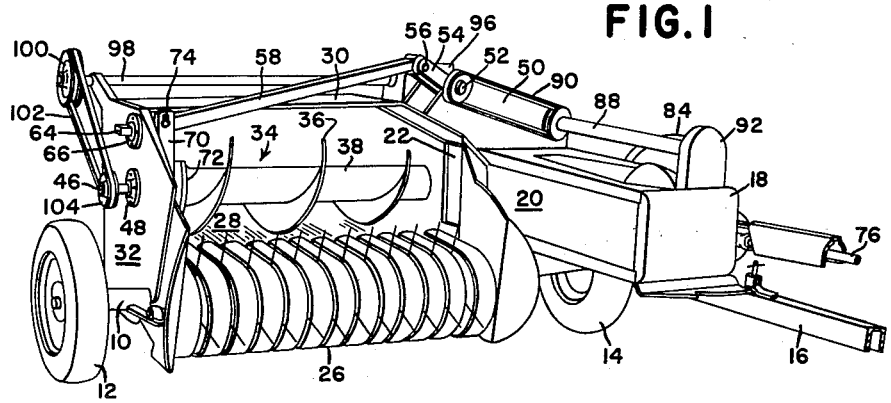
Fig. 1 is a front perspective view of a baler equipped with one form of the invention.
Figure 2:
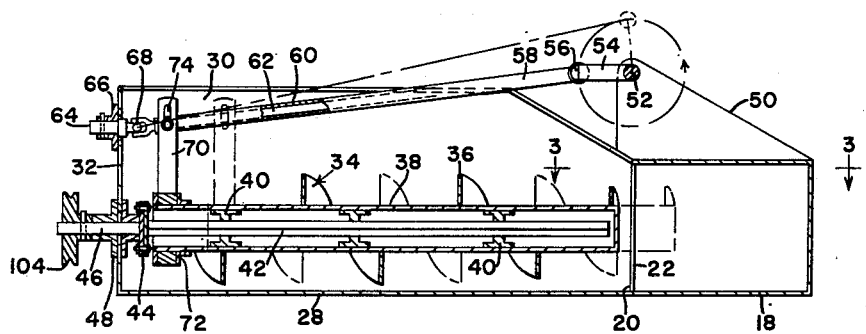
Fig. 2 is a transverse sectional view, as seen from above, showing the relationship between the feed auger, the floor means of the pick-up means and the bale case.

In that form of the invention shown in Figs. 1, 2 and 3, the means for moving crops transversely from the pick-up floor 28 into the bale case 18 comprises a reciprocating, elongated feed conveyor in the form of a rotating auger 34. This auger is conventionally equipped with a helical flight 36 which serves as movable portions for engaging and moving crops transversely inwardly over the floor 28. As best seen in Fig. 2, the inner end of the auger is proximate to the feed opening 22 and the outer end of the auger is proximate to the outer wall or support 32. The auger further has a hollow core 38 in which are fixed several axially spaced spiders 40 for receiving a driven shaft 42. This shaft is preferably square in section and each of the spiders 40 has a central square aperture, whereby the shaft is in effect keyed to the auger but the auger may have axial movement relative to the shaft.

The outer end of the shaft has a rigid but removable flanged connection 44 with a coaxial input or driving shaft 46. The shaft 46 is journaled in the outer wall or support 32 by means of a bearing 48 having sufficient axial length to support the shafting 42—46 in cantilever fashion, the strength of the structure being such that the weight of the auger 34 is supported for axial movement along the shaft 42, the bearing 48 being such that the shafting 42—46 is held in the outer wall or support 32 against relative axial displacement.

By means of the structure just described, the auger 34 is mounted for axial bodily shifting toward and away from the bale case 18, in such manner that the inner end of the auger is alternately and successively projected and withdrawn through the feed opening 22. Hence, as the auger rotates to serve its conventional function in feeding crops over the floor 28, it has the additional function of reciprocation, whereby crops at the discharge end of the auger are thrust into the bale case in the path of the reciprocating plunger 24. As will be brought out below, the reciprocation of the auger is in timed relationship with reciprocation of the plunger so that the discharge end of the auger is withdrawn before it is struck by the plunger.

The bale case 18 carries at an upper portion thereof inner supporting means 50 in which a crank shaft 52 is journaled for rotation about a longitudinal axis, or an axis that is transverse or normal to the axis of the auger 34. The crank shaft 52 has integral therewith a crank throw 54 to which is pivotally connected at 56 the inner end of a crank-driven pitman 58. This pitman extends laterally outwardly so that its outer end is proximate to the outer wall or support 32. The outer end portion of the pitman is hollow, as shown at 60 (Fig. 2), so as to telescopically receive a supporting or stabilizing shaft 62, this shaft serving as part of outer means including, in addition to the shaft, an outer supporting part 64 in the form of a stub shaft suitably fixed at 66 to the outer end support 32, plus a flexible or universal joint 68 between the parts 64 and 62. As the crank shaft 52 rotates, the pitman 58 is reciprocated, its outer end sliding at 60—62. Because the support for the outer end of the pitman combines both axial sliding and pivoting movement at the universal joint 68, the pitman may freely proceed through an orbital path, one phase of which is indicated in dot-dash lines in Fig. 2.

The auger 34, axially slidably supported on the shafting 42—46, is reciprocated by the pitman 58 through the medium of a pitman-to-auger connection comprising an arm 70 having its lower end journaled on the outer end of the auger by means of a collar 72. The upper end of the arm 72 has a pin and slot connection 74 with the pitman 58. The collar 72 is so constructed that the auger 34 may rotate relative to the arm 70 but is non-axially displaceable relative to the arm. Hence, as the pitman 58 is reciprocated by the crank shaft 52, the arm 70 serves to carry the auger 34 back and forth on the shafting 42—46, alternately projecting and withdrawing the discharge end of the auger through the feed opening 22. Because of the mounting of the auger 34 on the shafting 42—46, the motion of the auger will be linear, in addition to the rotating motion thereof. Thus, the final discharge of the crops into the bale chamber is effected by a thrusting action which facilitates proper formation of the bales by the plunger.

Figure 6:
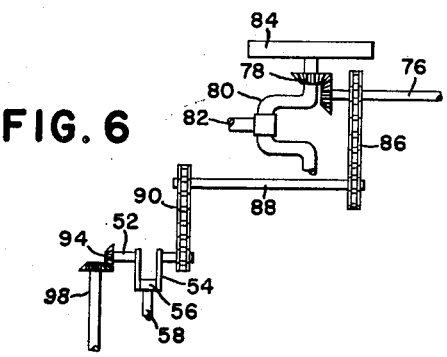
Fig. 6 is a schematic view illustrating the driving mechanism for the various parts of the machine.

In the baler illustrated, power for driving the various components of the machine is derived in the first instance from the power take off of the propelling tractor (not shown). Figs. 1 and 6 illustrate an input or propeller shaft 76, effective through bevel gearing 78 to drive a plunger crank shaft 80. A connecting rod 82 connects the throw of the crank shaft 80 to the plunger 24. The left hand end of the crank shaft 80 conventionally carries a fly wheel 84. The shaft 76 further serves, through suitable sprocket and chain means 86 to drive a longitudinal shaft 88 from which a sprocket and chain drive 90 is effected to the pitman crank shaft 52. In Fig. 1, the chain drive 86 is enclosed in a safety shield 92.

Bevel gearing 94 (Fig. 6), contained in a suitable gear housing 96 (Fig. 1), carries the drive from the pitman crank shaft 52 to a cross shaft 98, to the outer end of which is keyed a sheave 100. This sheave is belt-connected at 102 to a sheave 104 fixed to the outer end of the auger-driving shaft 46. The proper timing between the reciprocation of the plunger and the reciprocation of the auger will be readily appreciated from Fig. 6 wherein it is clear that the plunger crank shaft 80 has driven the plunger 24 to the end of its compression stroke while the pitman crank shaft 52 has driven the auger to the end of its retracting or withdrawal stroke. As the plunger crank shaft 80 rotates to cause retraction of the plunger 24, the pitman crank shaft 52 will cause the auger 34 to move on its projecting stroke. Consequently, there can be no conflict between the plunger and the discharge end of the auger 34 as they both travel on their respective strokes.

As will be seen from the foregoing, the simplified construction features the elimination of a secondary feeder, since the projection of the auger eliminates that feeder. Moreover, the invention features a simple and economical drive through the shafting 42—46, so that the supporting shaft serves the additional function of driving the auger 34, thereby constituting auger-rotating means as well as auger-supporting means.

Figure 4:
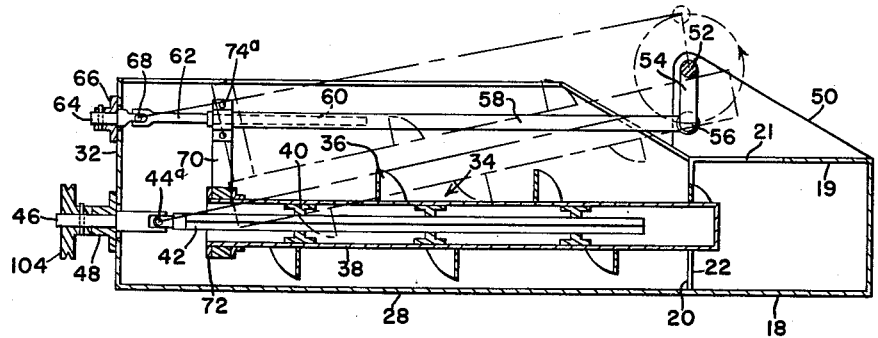
Fig. 4 is a view similar to Fig. 2 but showing a modified form of the invention.

Fig. 4 shows a modified form of the structure shown in Figs. 1 through 3 and, to the extent that the two are the same, identical reference characters will be used. It should be further assumed that the Fig. 4 structure can be readily substituted in the over-all baler structure in place of the structure of Fig. 2. To this end, then, Fig. 4 illustrates such basic components as the bale case 18, the upright side wall 20 in which the feed opening 22 is formed and on which is mounted the supporting structure 50 for journaling the pitman crank shaft 52. The throw 54 of the shaft is connected at 56 to the pitman 58 which has a sliding connection 60 to the stabilizing part or shaft 62, the end of the shaft 62 being connected by the universal joint 68 to the stub shaft 64, which in turn is mounted in the support 66 in the outer end wall 32. The basic auger structure 34 will be recognized as having the flights 36, the core 38, the spiders 40 and the internal shaft 42, the latter being connected by a universal joint 44a to the input shaft 46 which in turn is driven by the sheave 104 in the manner described in connection with Figs. 1 and 6. The bearing 48 again supports the shaft 46. The basic difference in Fig. 4 is that the auger 34 is suspended from the pitman 58, in which case the connection of the auger-supporting arm 70 to the pitman 58 is rigid, as at 74a and the universal joint 44a replaces the rigid joint 44. In other words, the shafting 42—46 is merely a driving shaft and does not serve to support the auger. Consequently, the motion of the auger 34 in Fig. 4 will not be linear as in Figs. 1 through 3 but will follow the orbital movement of the pitman 58. Because of this type of movement of the auger 34 in Fig. 4, the top wall 19 of the bale case is apertured at 21 to permit the discharge end of the auger to pass therethrough. As previously stated, the drive mechanism of Figs. 1 and 6 is applicable to the structure of Fig. 4.

Figure 5:
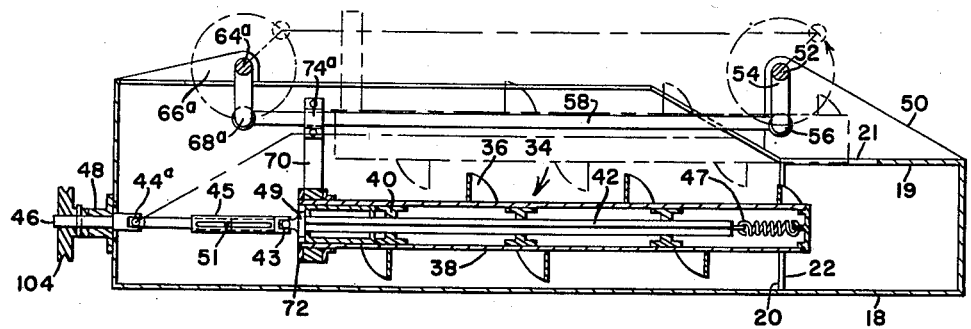
Fig. 5 is a view similar to Figs. 2 and 4 but showing a still further modified form of the invention.

In Fig. 5, the same basic components previously described will be recognized and to the extent that they are the same as those previously described, the same reference characters have been employed. It is believed that these will be evident without repetition, it being sufficient to note only that the auger 34 in Fig. 5, like the auger 34 in Fig. 4, is rigidly supported at 74a from the pitman 58. Another difference exists in the mounting of the outer end of the pitman. In this case, instead of the sliding and pivotal connection at 60—62—68, the outer end of the pitman is supported by a second crank shaft 64a, rotatable on an axis parallel to the axis of the crank shaft 52. The crank shaft 64a has a throw 66a which is pivotally connected at 68a to the outer end of the pitman 58. The relationship between the supporting arm 70 and the pitman 58 and auger 34 is the same as in Fig. 4. However, in view of the different type of orbital movement of the pitman 58 in Fig. 5, the auger 34 in Fig. 5 will have a similar orbital movement. For these reasons, the top wall 19 of the bale case has an opening 21 therein to permit free passage of the discharge end of the auger.

Another difference, arising because of the difference in movement of the auger 34 in Fig. 5, exists in the shafting 42—46. As before, the shaft 42 is carried in spiders 40 in the hollow core 38 of the auger 34, this auger, like those previously described, having the crop-moving portions for helical flight 36. The outer end of the shaft 42 is connected by a universal joint 43 to telescoping shaft sections 45 which in turn are connected to the universal joint 44a. Telescoping at 45 is in addition to that permitted because of the sliding arrangement between the shaft 42 and spiders 40. As before, the shaft 46 is supported in a suitable bearing 48 and has keyed thereto the sheave 104. As in Fig. 4, the auger 34 is suspended from the pitman 58 and the driving shafting 42—43—44a—45 is merely a driving and not a supporting shaft. The structure of Fig. 6 is applicable to the driving of the structure of Fig. 5.

In all forms of the invention, the feature is the elimination of the secondary feeder, because the discharge end of the auger serves that purpose. All of the augers are driven by the crank and pitman means and all pitmans are movably supported at their outer ends to permit the specific orbital movement. Another distinction in Fig. 5 over Fig. 4 is the addition of a spring 47, connected between the discharge end of the auger and the inner end of the shaft 42, the purpose of the spring being to keep the shaft 42 yieldably within the auger core 38, the opposite end of the shaft having a stop at 49 to limit inward movement of the shaft 42. The telescopic connection at 45 includes a stop 51 for permitting proper telescoping of the shafting.

Various features of the invention not categorically enumerated herein will undoubtedly occur to those versed in the art, as will many modifications and alterations in the preferred forms of the invention disclosed, all of which may be achieved without departing from the spirit and scope of the invention.

What is claimed is:

1. A baler, comprising: a mobile frame including an elongated bale case having an upright side wall provided with a feed opening, and a baling plunger carried in the bale case for reciprocation on successive compression and retracting strokes to respectively cover and uncover the feed opening; crop pick-up means connected to the frame and having floor means extending laterally outwardly from and leading laterally inwardly to the feed opening; an outer support on the frame in laterally outwardly spaced relation to the feed opening; an auger positioned over the floor means with its axis transverse to and alined with the feed opening and having inner and outer ends respectively proximate to the feed opening and the outer support; a crank carried by the bale case above the feed opening for rotation about an axis transverse to the auger axis; a pitman having an inner end connected to the crank and an outer end proximate to the outer support; means on the outer support and carrying the outer end of the pitman for back and forth movement as the pitman is reciprocated by the crank; means connecting the auger to the pitman for reciprocation of the two in unison; drive means connected to the crank and operating in timed relationship with the plunger to shift the auger toward and away from the feed opening respectively in time with the retracting and compressing strokes of the plunger; and auger-rotating means for rotating the auger during reciprocation thereof.

2. The invention defined in claim 1, in which: the means carrying the outer end of the pitman includes a combined sliding and pivoting connection in which sliding is lengthwise of the pitman and pivoting is about an axis parallel to the crank axis.

3. The invention defined in claim 1, in which: the means carrying the outer end of the pitman includes a second crank journaled on the support on an axis parallel to the axis of the first-mentioned crank and having a crank throw connected to the outer end of the pitman.

4. A baler, comprising: a mobile frame including an elongated bale case having an upright side wall provided with a feed opening, and a baling plunger carried in the bale case for reciprocation on successive compression and retracting strokes to respectively cover and uncover the feed opening; crop pick-up means connected to the frame and having floor means extending laterally outwardly from and leading laterally inwardly to the feed opening; an outer support on the frame in laterally outwardly spaced relation to the feed opening; an auger positioned over the floor means with its axis transverse to and alined with the feed opening and having inner and outer ends respectively proximate to the feed opening and the outer support; a pitman generally parallel to the auger and having inner and outer ends respectively proximate to the bale case and the outer support; inner means supporting the inner end of the pitman on the frame for reciprocation transverse to the bale case; outer means supporting the outer end of the pitman on the outer support for such reciprocation; means supporting the auger on the pitman for reciprocation of the two in unison; drive means connected to the pitman and operating in timed relationship with the plunger to shift the auger and pitman toward and away from the feed opening respectively in time with the retracting and compression strokes of the plunger; and auger-rotating means for rotating the auger during reciprocation thereof.

5. The invention defined in claim 4, in which: the pitman is hollow and one of said inner and outer means includes a supporting part telescopically received in the hollow pitman.

6. The invention defined in claim 4, in which: the auger-rotating means includes axially extensible and retractible shafting comprising a first shaft part journaled in the outer support and a coaxial second shaft part driven by the first shaft part and connected to the auger for rotation therewith.

7. The invention defined in claim 4, in which: the auger-rotating means includes a hollow core in the auger, a driven shaft connected to and coaxially received in the core for rotation with the core but axially movable relative to the core, a driving shaft coaxial with the driven shaft and journaled in the outer support and held in said support against axial displacement.

8. The invention defined in claim 4, in which: the outer means carries the pitman for pivoting about an axis transverse to the auger axis, the inner means is arcuately movable about an axis parallel to the outer means pivoting axis so that the inner portion of the pitman moves transversely as well as lengthwise of the auger; and the auger-rotating means includes extensible and retractible driveshafting coaxial with the auger, comprising a first part keyed to the auger, a second part journaled in the outer support, and a flexible joint interconnecting said shaft parts.

9. The invention defined in claim 8, in which: the first shaft part is axially slidable in the auger, and the second shaft part is held against axial displacement relative to the outer support.

10. The invention defined in claim 4, in which: the pitman is positioned above the auger; and the means connecting the auger to the pitman includes an arm having its upper end fixed to the outer end of the pitman and its lower end journalling the outer end of the auger, said lower end including means holding the auger and said lower end against relative axial displacement.

11. A baler, comprising: a mobile frame including an elongated bale case having an upright side wall provided with a feed opening, and a baling plunger carried in the bale case for reciprocation on successive compression and retracting strokes to respectively cover and uncover the feed opening; crop pick-up means connected to the frame and having floor means extending laterally outwardly from and leading laterally inwardly to the feed opening; an outer support on the frame in laterally outwardly spaced relation to the feed opening; an auger positioned over the floor means with its axis transverse to and alined with the feed opening and having inner and outer ends respectively proximate to the feed opening and the outer support, said auger being bodily shiftable generally axially toward and away from the bale case to respectively project and withdraw the inner end thereof through the uncovered feed opening; a pitman generally parallel to the auger and having inner and outer ends respectively proximate to the bale case and the outer support; inner means supporting the inner end of the pitman on the frame for reciprocation transverse to the bale case; outer means supporting the outer end of the pitman on the outer support for such reciprocation; means supporting the auger on the pitman for reciprocation of the two in unison to project and withdraw the inner end of the auger through the uncovered feed opening; drive means connected to the pitman and operating in timed relationship with the plunger to shift the auger and pitman toward and away from the feed opening respectively in time with the retracting and compression strokes of the plunger; and auger-rotating means for rotating the auger during reciprocation thereof.

12. A baler, comprising: a mobile frame including an elongated bale case having an upright side wall provided with a feed opening, and a baling plunger carried in the bale case for reciprocation on successive compression and retracting strokes to respectively cover and uncover the feed opening; crop pick-up means connected to the frame and having floor means extending laterally outwardly from and leading laterally inwardly to the feed opening; an outer support on the frame in laterally outwardly spaced relation to the feed opening; an elongated conveyor positioned over the floor means with its length transverse to and alined with the feed opening and having inner and outer ends respectively proximate to the feed opening and the outer support and including lengthwise movable crop-engaging portions for moving crops from the floor means to the feed opening; a pitman generally parallel to the conveyor and having inner and outer ends respectively proximate to the bale case and the outer support; inner means supporting the inner end of the pitman on the frame for reciprocation transverse to the bale case; outer means supporting the outer end of the pitman on the outer support for such reciprocation; means supporting the conveyor on the pitman for reciprocation of the two in unison; pitman-drive means connected to the pitman and operating in timed relationship with the plunger to continuously shift the conveyor and pitman toward and away from the feed opening respectively in time with the retracting and compression strokes of the plunger; and conveyor-driving means additional to the pitman for continuously moving the crop-engaging portions of the conveyor during reciprocation thereof.

13. A baler, comprising a mobile frame including a bale case and crop pick-up means adjacent to said bale case, said bale case having walls and one of said walls having a feed opening for the introduction therethrough of crops, and said pick-up means including floor means leading toward said feed opening; bale-forming means in the bale case and arranged for cyclic operation to form bales of crops introduced through said feed opening; an auger positioned over the floor means with its axis directed toward said feed opening and operative to move crops toward said feed opening, said auger having a near end proximate to and a far end remote from the feed opening; a support on the frame adjacent to the far end of the auger; a crank carried by the frame adjacent to the near end of the auger for rotation about an axis transverse to the auger axis; a pitman having a near end connected to the crank and a far end proximate to the support; means on the support and carrying the far end of the pitman for back and forth movement as the pitman is reciprocated by the crank; means connecting the auger to the pitman for reciprocation of the two in unison; drive means connected to the crank and operating in timed relationship with the cyclic operation of the bale-forming means to shift the auger bodily toward and away from the feed opening for expediting the movement of crops toward said feed openings; and auger-rotating means for rotating the auger.

14. A baler comprising, a mobile frame including a bale case and crop pick-up means adjacent to said bale case, said bale case having walls of which one is provided with a feed opening, and said pick-up means including floor means leading toward said feed opening; bale-forming means in the bale case and arranged for cyclic operation to form bales of crops introduced through said feed opening; a conveyor positioned over the floor means and having movable crop-engaging portions thereon for moving crops toward the feed opening; means arranging the conveyor for bodily shifting thereof toward and away from the feed opening in addition to the movement of said crop-engaging portions whereby to expedite the delivery of crops toward said feed opening; said conveyor having a near end proximate to and a far end remote from said feed opening; a support on the frame adjacent to the far end of the conveyor; a crank carried by the frame adjacent to the near end of the conveyor for rotation about an axis transverse to the direction of crops moved by said conveyor; a pitman having a near end connected to the crank and a far end proximate to the outer support; means on the outer support and carrying the outer end of the pitman for back and forth movement as the pitman is reciprocated by the crank; means connecting the conveyor to the pitman for bodily reciprocation of the conveyor by the pitman; drive means connected to the crank and operating in timed relationship with the cyclic operation of the bale-forming means to continuously shift the conveyor bodily toward and away from the feed opening; and conveyor driving means additional to the pitman for continuously moving the crop-engaging portions of the conveyor during reciprocation thereof.

References Cited in the file of this patent

UNITED STATES PATENTS

| Re. 21,132 | Innes | June 27, 1939 |
| 2,030,031 | Innes | Feb. 4, 1936 |
| 2,067,583 | Stark | Jan. 12, 1937 |
| 2,571,489 | Russell | Oct. 16, 1951 |

FOREIGN PATENTS

| 153,133 | Australia | Sept. 8, 1953 |